(12) United States Patent
Kim et al.

(10) Patent No.: US 9,365,102 B2
(45) Date of Patent: *Jun. 14, 2016

(54) POWER TRANSMISSION SYSTEM OF HYBRID ELECTRIC VEHICLE

(71) Applicant: Hyundai Motor Company, Seoul (KR)

(72) Inventors: Baekyu Kim, Whasung-Si (KR); Chulmin Ahn, Whasung-Si (KR); Seok Joon Kim, Whasung-Si (KR); SungGon Byun, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,416

(22) Filed: Oct. 16, 2014

(65) Prior Publication Data

US 2015/0148171 A1    May 28, 2015

(30) Foreign Application Priority Data

Nov. 27, 2013  (KR) .................. 10-2013-0145222

(51) Int. Cl.
| | |
|---|---|
| *F16H 3/72* | (2006.01) |
| *B60K 6/36* | (2007.10) |
| *B60K 6/383* | (2007.10) |
| *B60K 6/445* | (2007.10) |
| *B60K 6/38* | (2007.10) |

(52) U.S. Cl.
CPC . *B60K 6/36* (2013.01); *B60K 6/383* (2013.01); *B60K 6/445* (2013.01); *B60K 2006/381* (2013.01); *Y02T 10/6239* (2013.01); *Y10S 903/917* (2013.01)

(58) Field of Classification Search
None
See application file for complete search history.

(56) References Cited

U.S. PATENT DOCUMENTS

| | | | | | |
|---|---|---|---|---|---|
| 5,558,588 | A | * | 9/1996 | Schmidt | 475/5 |
| 5,558,589 | A | * | 9/1996 | Schmidt | 475/5 |
| 5,669,842 | A | * | 9/1997 | Schmidt | 475/5 |
| 5,730,676 | A | * | 3/1998 | Schmidt | 475/5 |
| 6,371,882 | B1 | * | 4/2002 | Casey et al. | 477/5 |
| 6,793,600 | B2 | * | 9/2004 | Hiraiwa | 475/5 |
| 6,811,508 | B2 | * | 11/2004 | Tumback | 475/5 |
| 6,890,280 | B2 | | 5/2005 | Oshidari et al. | |
| 7,166,050 | B2 | * | 1/2007 | Schmidt et al. | 475/5 |
| 8,337,352 | B2 | * | 12/2012 | Morrow et al. | 475/5 |
| 9,114,804 | B1 | * | 8/2015 | Shukla et al. | |

(Continued)

FOREIGN PATENT DOCUMENTS

| | | |
|---|---|---|
| JP | 2006-137333 A | 6/2006 |
| JP | 4367181 B2 | 9/2009 |

(Continued)

*Primary Examiner* — Dirk Wright
(74) *Attorney, Agent, or Firm* — Morgan, Lewis & Bockius LLP

(57) ABSTRACT

A power transmission system of a hybrid electric vehicle may include an input device including a first input shaft receiving torque of the engine and a second input shaft disposed without rotational interference with the first input shaft, a planetary gear set including a first rotation element directly connected to the second input shaft, a second rotation element directly connected to the first input shaft, and a third rotation element, a supplemental input device including a first intermediate shaft and a second intermediate shaft, a friction member selectively connecting the first intermediate shaft to a transmission housing, an output device operably connected to the input device and the supplemental input device and outputting torque transmitted from the input device or the supplemental input device, and a final reduction device decelerating torque transmitted from the output device and outputting the decelerated torque.

14 Claims, 5 Drawing Sheets

(56) References Cited

U.S. PATENT DOCUMENTS

2015/0167807 A1* 6/2015 Ahn et al.
2015/0167808 A1* 6/2015 Kim et al.

FOREIGN PATENT DOCUMENTS

| JP | 2011-131828 A | 7/2011 |
|----|---------------|--------|
| KR | 10-0820401 B1 | 4/2008 |

\* cited by examiner

POWER TRANSMISSION SYSTEM OF HYBRID ELECTRIC VEHICLE

CROSS-REFERENCE TO RELATED APPLICATION

The present application claims priority to Korean Patent Application No. 10-2013-0145222 filed Nov. 27, 2013, the entire contents of which is incorporated herein for all purposes by this reference.

BACKGROUND OF THE INVENTION

1. Field of the Invention

The present invention relates to a power transmission system of a hybrid electric vehicle. More particularly, the present invention relates to a power transmission system of a hybrid electric vehicle that can improve fuel economy by achieving electric continuously variable shift at electric vehicle (EV) mode and minimizing the number of frictional elements operated at parallel mode.

2. Description of Related Art

Environmentally-friendly techniques of vehicles are very important techniques on which survival of the future motor industry is dependent. Vehicle makers are focusing on development of environmentally-friendly vehicles so as to meet environment and fuel consumption regulations.

Therefore, the vehicle makers have been developing future vehicles such as electric vehicles (EV), hybrid electric vehicles (HEV), and fuel cell electric vehicles (FCEV).

Since the future vehicles have technical restrictions such as weight and cost, the vehicle makers keep observation upon hybrid electric vehicles for meeting exhaust gas regulations and improving fuel consumption performance and are competing desperately to put hybrid electric vehicles to practical use.

Hybrid electric vehicles are vehicles using more than two power sources, and gasoline engines or diesel engines using fossil fuel and motor/generators driven by electrical energy are mainly used as the power sources of the hybrid electric vehicles.

The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and uses the motor/generator at a low-speed region, fuel consumption may be improved and exhaust gas may be reduced.

The power transmission system of a hybrid electric vehicle is classified into a single-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the single-mode type.

Since the multi-mode type has high efficiency at the high-speed region and is able to multiply torque autonomously, the multi-mode type can be applied to a full size vehicle.

Therefore, the multi-mode type instead of the single-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear sets, and a battery used as a power source of the motor/generators.

The power transmission system of the multi-mode type has different operating mechanisms depending on connections of the planetary gear sets, the motor/generators, and the torque delivery apparatus.

In addition, the power transmission system of the multi-mode type has different features such a durability, power delivery efficiency, and size depending on the connections of the planetary gear sets, the motor/generators, and the torque delivery apparatus. Therefore, designs for the connection structure of the power transmission systems of a hybrid electric vehicle are also under continuous investigation to achieve robust and compact power transmission systems having no power loss.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission system of a hybrid electric vehicle having advantages of improving fuel economy by achieving electric continuously variable shift at electric vehicle (EV) mode and minimizing the number of frictional elements operated at parallel mode.

Various aspects of the present invention are directed to providing a power transmission system of a hybrid electric vehicle having further advantages of minimizing a length thereof and improving mountability by dispersedly disposing the components of the power transmission system on three shafts disposed in parallel with each other.

According to various aspects of the present invention, a power transmission system of a hybrid electric vehicle which uses an engine and first and second motor/generators as power sources may include an input device having a first input shaft receiving torque of the engine and a second input shaft disposed without rotational interference with the first input shaft, a planetary gear set including a first rotation element directly connected to the second input shaft, a second rotation element directly connected to the first input shaft, and a third rotation element, a supplemental input device including a first intermediate shaft disposed in parallel with and apart from the first and second input shafts and operably connected to the first motor/generator and the second input shaft, and a second intermediate shaft disposed without rotational interference with the first intermediate shaft and operably connected to the second motor/generator, a friction member selectively connecting the first intermediate shaft to a transmission housing, an output device operably connected to the input device and the supplemental input device and outputting torque transmitted from the input device or the supplemental input device, and a final reduction device decelerating torque transmitted from the output device and outputting the decelerated torque.

The power transmission system may further include: a first input gear fixedly disposed on the second input shaft and a second input gear directly connected to the third rotation element of the planetary gear set.

The power transmission system may further include a one-way clutch disposed between the first input shaft and the transmission housing.

The planetary gear set may be a single pinion planetary gear set.

The first rotation element may be a sun gear, the second rotation element may be a planet carrier, and the third rotation element may be a ring gear.

The power transmission system may further include a clutch disposed between the planet carrier and the ring gear and direct-coupling the planetary gear set selectively.

The second input shaft may be a hollow shaft and the first input shaft may penetrate through the second input shaft.

The supplemental input device may include a first intermediate gear fixedly disposed on the first intermediate shaft and engaged with the first input gear, and a second intermediate gear fixedly disposed on the second intermediate shaft and engaged with the second input gear.

The first intermediate shaft may be a hollow shaft and the second intermediate shaft may penetrate through the first intermediate shaft.

The friction member may be a brake disposed between the first intermediate shaft and the transmission housing.

The output device may include an output shaft disposed in parallel with and apart from the first and second input shafts, a first output gear fixedly disposed on one side portion of the output shaft and engaged with the second input gear and the second intermediate gear, and a second output gear disposed at another side portion of the output shaft and configured to transmit torque to the final reduction device.

The final reduction device may include a final reduction gear engaged with the second output gear, and a differential apparatus receiving torque from the output device through the final reduction gear and transmitting the torque to a driving wheel.

In various aspects of the present invention, a power transmission system of a hybrid electric vehicle which uses an engine and first and second motor/generators as power sources may include an input device including a first input shaft receiving torque of the engine, a second input shaft disposed without rotational interference with the first input shaft, a first input gear fixedly disposed on the second input shaft, and a second input gear, a planetary gear set including a sun gear directly connected to the second input shaft, a planet carrier directly connected to the first input shaft, and a ring gear directly connected to the second input gear as rotation elements of the planetary gear set, a supplemental input device including a first intermediate shaft disposed in parallel with and apart from the first and second input shafts and operably connected to the first motor/generator and the second input shaft, and a second intermediate shaft disposed without rotational interference with the first intermediate shaft and operably connected to the second motor/generator, and an output device operably connected to the input device and the supplemental input device and outputting torque transmitted from the input device or the supplemental input device.

The power transmission system may further include a final reduction device decelerating torque transmitted from the output device and outputting the decelerated torque.

The power transmission system may further include a one-way clutch disposed between the first input shaft and a transmission housing.

The power transmission system may further include a clutch disposed between the planet carrier and the ring gear and direct-coupling the planetary gear set selectively.

The supplemental input device may further include a first intermediate gear fixedly disposed on the first intermediate shaft and engaged with the first input gear, and a second intermediate gear fixedly disposed on the second intermediate shaft and engaged with the second input gear.

The output device may include an output shaft disposed in parallel with and apart from the first and second input shafts; a first output gear fixedly disposed on one side portion of the output shaft and engaged with the second input gear and the second intermediate gear, and a second output gear disposed at another side portion of the output shaft and configured to transmit torque to the final reduction device.

The power transmission system may further include a brake disposed between the first intermediate shaft and a transmission housing and selectively connecting the first intermediate shaft to the transmission housing.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
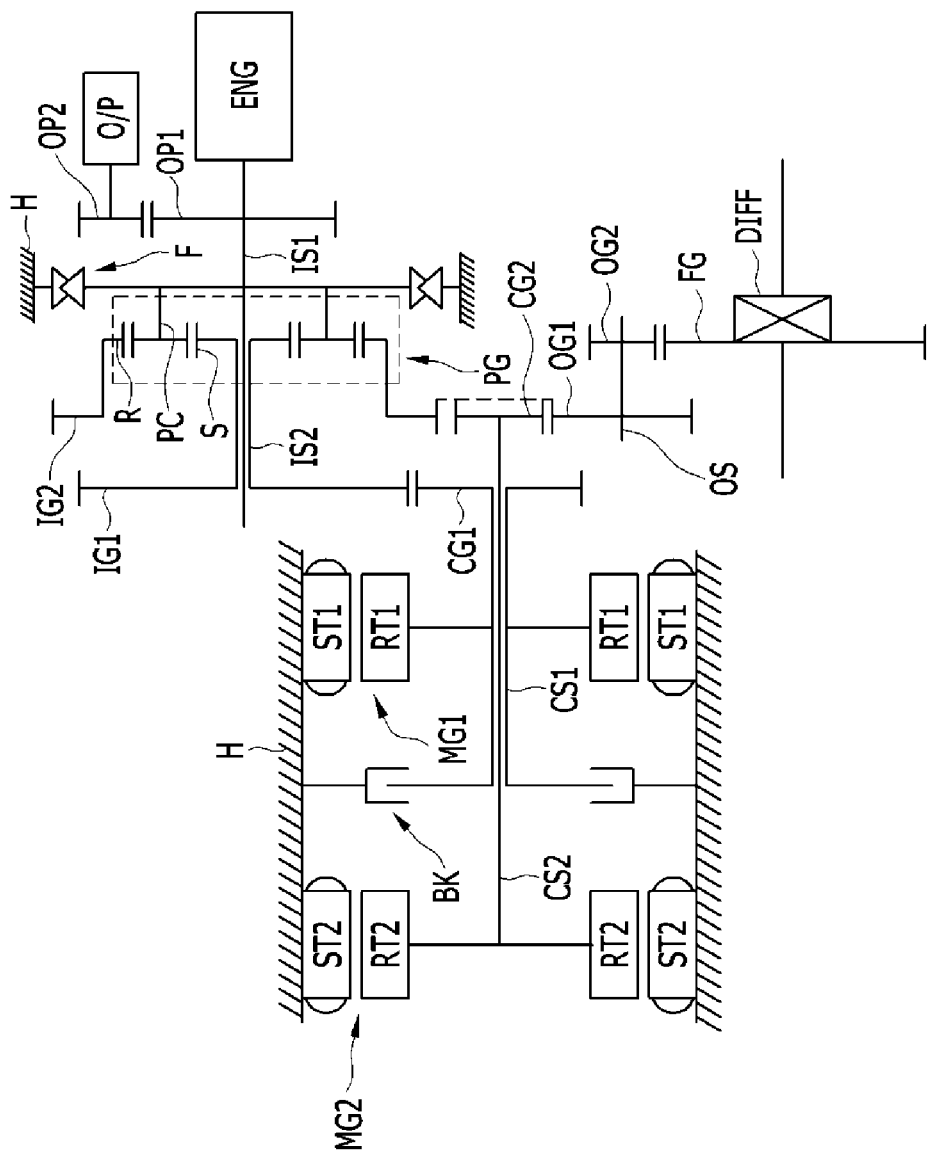
FIG. 1 is a schematic diagram of an exemplary power transmission system according to the present invention.

FIG. 1 is a schematic diagram of a power transmission system according to various embodiments of the present invention.

Referring to FIG. 1, a power transmission system of a hybrid electric vehicle according to various embodiments of the present invention uses an engine ENG and first and second motor/generators MG1 and MG2 as power sources, and includes an input device (IS1 and IS2), a planetary gear set PG, a supplemental input device (CS1 and CS2), a friction member (BK), an output device, and a final reduction device.

The engine ENG is a main power source, and a gasoline engine or a diesel engine using fossil fuel may be used.

Torque generated by the engine ENG is transmitted to a transmission through the input device, and the input device may be connected to an output side of the engine ENG through a damper and a clutch or without disposing the damper and the clutch therebetween.

The input device includes a first input shaft IS1 and a second input shaft IS2.

The first input shaft IS1 is operably connected to the engine ENG so as to receive the torque of the engine ENG.

The second input shaft IS2 is a hollow shaft and is disposed coaxially and radially exterior to the first input shaft IS1 without rotational interference therebetween. That is, the first input shaft IS1 is inserted in the second input shaft IS2 without rotational interference. First and second input gears IG1 and IG2 are disposed on the second input shaft IS2.

The planetary gear set PG is a simple planetary gear set such as a single pinion planetary gear set or a double pinion planetary gear set. It is exemplified in the various embodiments of the present invention that the planetary gear set PG is the single pinion planetary gear set.

The planetary gear set PG includes a sun gear S, a ring gear R, and a planet carrier PC rotatably supporting a plurality of pinion gears engaged with the sun gear S and the ring gear R.

The sun gear S is directly connected to a side portion of the second input shaft IS2, the planet carrier PC is directly connected to a side portion of the first input shaft IS1, and the ring gear R is directly connected to the second input gear IG2.

In addition, the planet carrier PC as well as the first input shaft IS1 are connected to a transmission housing H through a one-way clutch F so as to be prevented from rotating in a predetermined direction (e.g., inverse direction). The first input gear IG1 is fixedly disposed at the other end portion of the second input shaft IS2.

The supplemental input device includes first and second intermediate shafts CS1 and CS2 disposed in parallel with and apart from the first and second input shafts IS1 and IS2.

The first intermediate shaft CS1 is operably connected to the first motor/generator MG1 and the second input shaft IS2, and the second intermediate shaft CS2 is inserted in the first intermediate shaft CS1 without rotational interference therebetween and is operably connected to the second motor/generator MG2.

The first motor/generator MG1 includes a first stator ST1 fixed to the transmission housing H and a first rotor RT1 being rotatable in the first stator ST1. The first rotor RT1 is directly connected to the first intermediate shaft CS1.

In addition, the first intermediate shaft CS1 is a hollow shaft, and a first intermediate gear CG1 is fixedly disposed on an end portion of the first intermediate shaft CS1 and is engaged with the first input gear IG1.

The first motor/generator MG1 may be operated as a generator by the torque of the engine ENG input through the first input gear IG1. In this case, electrical energy generated by the first motor/generator MG1 is used to charge a battery (not shown) or is supplied to the second motor/generator MG2.

In addition, the first motor/generator MG1 may be operated as a motor outputting driving torque when the vehicle runs with high speed or the engine is started.

The second motor/generator MG2 includes a second stator ST2 fixed to the transmission housing H and a second rotor RT2 being rotatable in the second stator ST2. The second rotor RT2 is directly connected to the second intermediate shaft CS2.

In addition, the second intermediate shaft CS2 penetrates through the first intermediate shaft CS2 and a second intermediate gear CG2 is fixedly disposed on an end portion of the second intermediate shaft CS2.

The second motor/generator MG2 is mainly operated as a motor assisting driving torque for driving the vehicle, and may be operated as a generator regenerating braking force of the vehicle into electrical energy when the vehicle decelerates.

In addition, the friction member includes a brake BK selectively connecting the first intermediate shaft CS1 to the transmission housing H.

The brake BK is disposed between the first motor/generator MG1 and the second motor/generator MG2 and selectively connects the other end portion of the first intermediate shaft CS1 to the transmission housing H. The brake BK may be operated at engine direct-coupling mode where the sun gear S of the planetary gear set PG is operated as a fixed element.

The brake BK may be a conventional multi-plate friction element of wet type that is operated by hydraulic pressure and is controlled by a hydraulic control system.

In addition, the output device includes an output shaft OS disposed in parallel with and apart from the first and second input shafts IS1 and IS2, and a first output gear OG1 and a second output gear OG2 fixedly disposed respectively on both end portions of the output shaft OS.

The first output gear OG1 is engaged with the second input gear IG2 and the second intermediate gear CG2 on the second intermediate shaft CS2, and the second output gear OG2 is engaged with the final reduction device.

The final reduction device includes a differential apparatus DIFF and a final reduction gear FG. The final reduction gear FG is engaged with the second output gear OG2 so as to decelerate torque transmitted from the output shaft OS and transmit the decelerated torque to a driving wheel through the differential apparatus DIFF.

In FIG. 1, O/P denotes a hydraulic pump. The hydraulic pump receives torque of the first input shaft IS1 through a hydraulic pump drive gear OP1 disposed on the first input shaft IS1 and a hydraulic pump driven gear OP2 engaged with the hydraulic pump drive gear OP1, and produces hydraulic pressure needed in the transmission.

Figure 2:
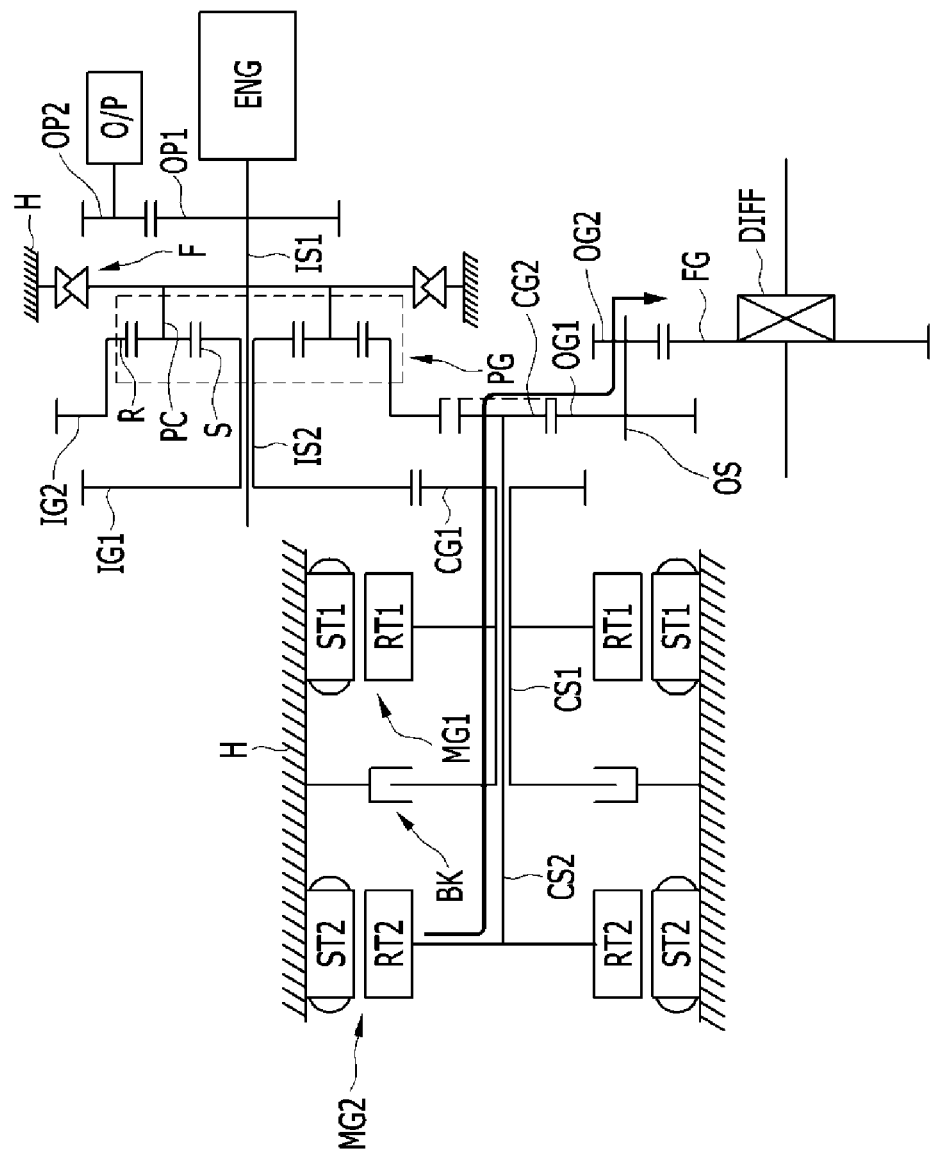
FIG. 2 is a schematic diagram illustrating torque flow of the exemplary power transmission system of a hybrid electric vehicle at an EV mode according to the present invention.

FIG. 2 is a schematic diagram for illustrating torque flow of a power transmission system of a hybrid electric vehicle according to various embodiments of the present invention at EV mode.

Referring to FIG. 2, in a state that the engine ENG is stopped, the driving torque of the second motor/generator MG2 is transmitted to the final reduction gear FG of the differential apparatus DIFF through the second intermediate shaft CS2, the second intermediate gear CG2, the first output gear OG1, the output shaft OS, and the second output gear OG2 at electric vehicle (EV) mode.

That is, electric continuously variable shift can be achieved by controlling rotation speed of the second motor/generator MG2.

Figure 3:
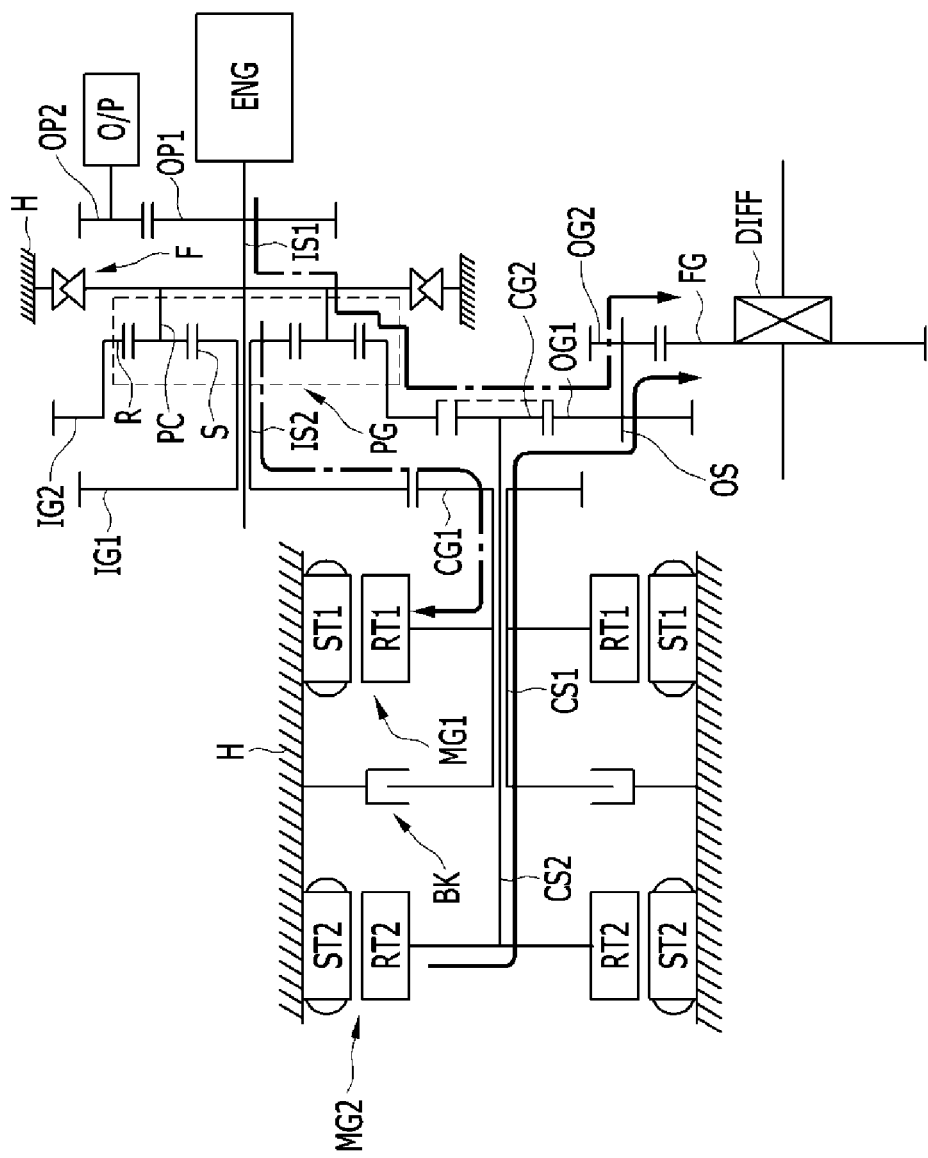
FIG. 3 is a schematic diagram illustrating torque flow of the exemplary power transmission system of the hybrid electric vehicle at a power split mode according to the present invention.

FIG. 3 is a schematic diagram for illustrating torque flow of the power transmission system of the hybrid electric vehicle at power split mode according to various embodiments of the present invention.

Referring to FIG. 3, the torque of the engine ENG is transmitted to the driving wheel and the first motor/generator MG1, and the torque of the second motor/generator MG2 is used as auxiliary power at power split mode.

If the engine ENG is started by the first motor/generator MG1, the torque of the engine ENG is divided by the planetary gear set PG, a portion of the torque is transmitted to the driving wheel through the second input gear IG2, the first output gear OG1, the output shaft OS, the second output gear OG2, and the final reduction gear FG of the differential apparatus DIFF, and the other portion of the torque is transmitted to the first motor/generator MG1 through the second input gear IG2, the first intermediate gear CG1, and the first intermediate shaft CS1 so as to cause the first motor/generator MG1 to generate electric energy.

The electrical energy generated by the first motor/generator MG1 is used to drive the second motor/generator MG2 or charge a battery.

In addition, the torque of the second motor/generator MG2 is transmitted to the driving wheel through the second intermediate shaft CS2, the second intermediate gear CG2, the first output gear OG1, the output shaft OS, the second output gear OG2, and the final reduction gear FG of the differential apparatus DIFF.

Figure 4:
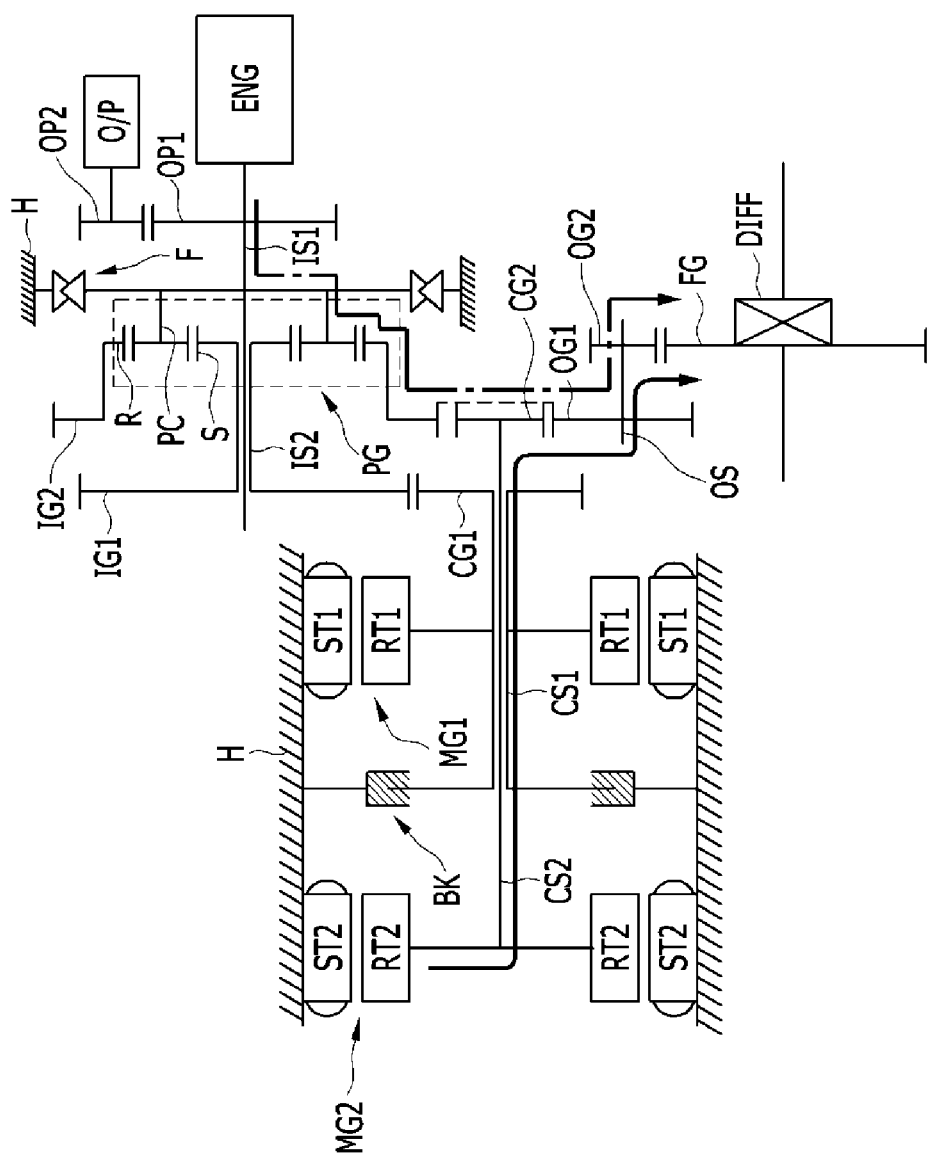
FIG. 4 is a schematic diagram illustrating torque flow of the power transmission system of the hybrid electric vehicle at an engine direct-coupling (Overdrive; OD) mode according to the first exemplary embodiment of the present invention.

FIG. 4 is a schematic diagram for illustrating torque flow of the power transmission system of the hybrid electric vehicle at an engine direct-coupling (Overdrive; OD) mode according to various embodiments of the present invention.

Referring to FIG. 4, the brake BK is operated and the sun gear S of the planetary gear set PG is operated as the fixed element at engine direct-coupling (Overdrive; OD) mode.

In this case, the torque of the engine ENG is accelerated by the planetary gear set PG and the accelerated torque is transmitted to the driving wheel through the second input gear IG2, the first output gear OG1, the output shaft OS, the second output gear OG2, and the final reduction gear FG of the differential apparatus DIFF.

In addition, the torque of the second motor/generator MG2 is transmitted to the driving wheel through the second intermediate shaft CS2, the second intermediate gear CG2, the first output gear OG1, the output shaft OS, the second output gear OG2, and the final reduction gear FG of the differential apparatus DIFF.

Figure 5:
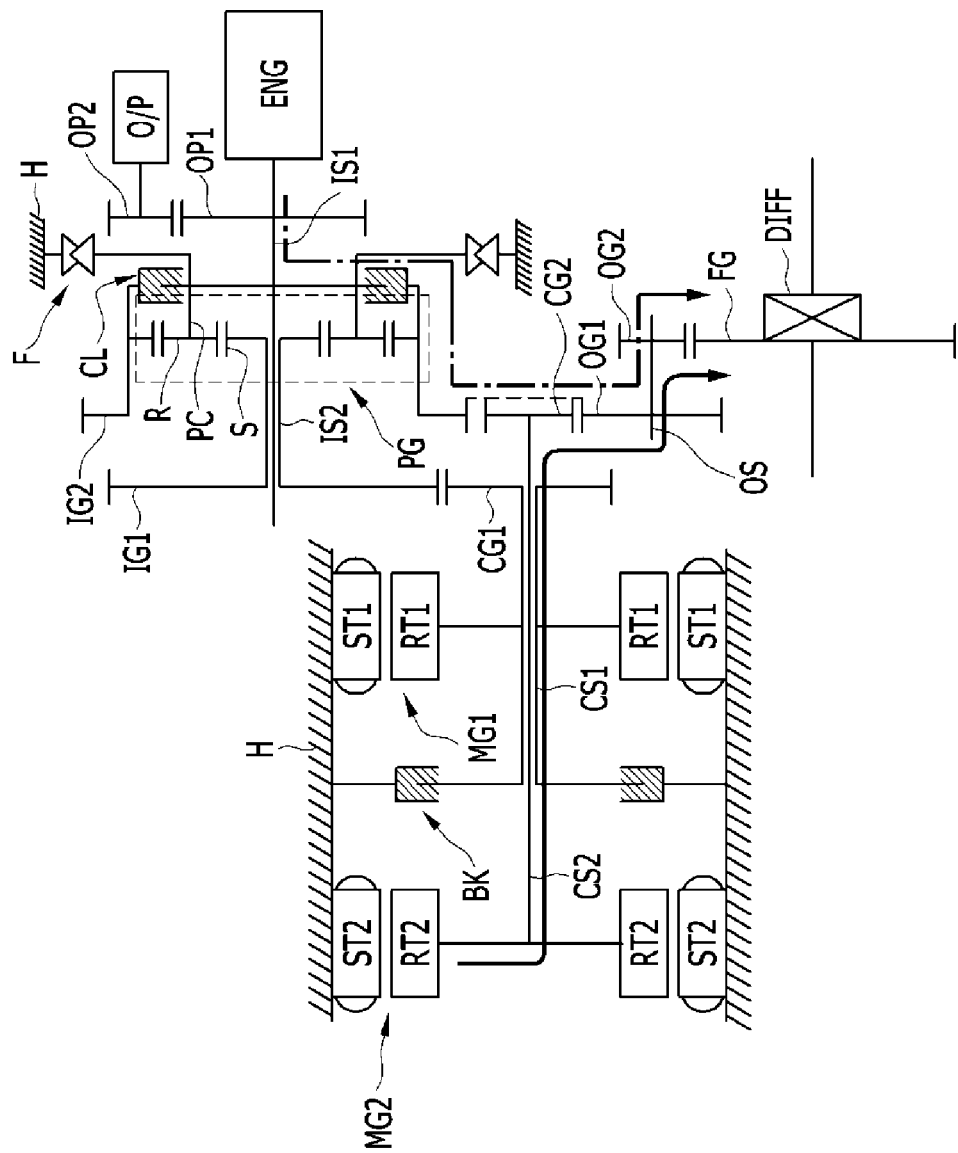
FIG. 5 is a schematic diagram illustrating torque flow of an exemplary power transmission system of a hybrid electric vehicle at an engine direct-coupling (1:1) mode according to the present invention.

FIG. 5 is a schematic diagram for illustrating torque flow of a power transmission system of a hybrid electric vehicle at an engine direct-coupling (1:1) mode according to various embodiments of the present invention.

Referring to FIG. 5, a clutch CL is added for direct-coupling the planetary gear set PG in various embodiments of the present invention, compared with previous embodiments.

That is, the clutch CL selectively connects two rotation elements among three rotation elements of the planetary gear set PG so as to cause the planetary gear set PG to become a direct-coupling state. In this case, rotation speed of the engine ENG is output through the planetary gear set PG without rotation speed change.

Therefore, the torque of the engine ENG, without rotation speed change, is output through the planetary gear set PG, and is then transmitted to the driving wheel through the second input gear IG2, the first output gear OG1, the output shaft OS, the second output gear OG2, and the final reduction gear FG of the differential apparatus DIFF.

In addition, the torque of the second motor/generator MG2 is transmitted to the driving wheel through the second intermediate shaft CS2, the second intermediate gear CG2, the first output gear OG1, the output shaft OS, the second output gear OG2, and the final reduction gear FG of the differential apparatus DIFF.

In the power transmission system according to various embodiments of the present invention, since the engine ENG is stopped and the vehicle is driven by the second motor/generator MG2 at the EV mode, unnecessary mechanical loss may be minimized and power delivery efficiency may be improved.

Further, since components of the transmission system are dispersedly disposed on three rotation shafts disposed in parallel with each other, a length of the transmission system may be minimized.

In addition, electric continuously variable shift may be achieved at the EV mode and the number of frictional elements operated at the parallel mode may be minimized.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission system of a hybrid electric vehicle which uses an engine and first and second motor/generators as power sources, comprising:
    an input device including a first input shaft receiving torque of the engine and a second input shaft disposed without rotational interference with the first input shaft;
    a planetary gear set including a first rotation element directly connected to the second input shaft, a second rotation element directly connected to the first input shaft, and a third rotation element;
    a supplemental input device including a first intermediate shaft disposed in parallel with and apart from the first and second input shafts and operably connected to the first motor/generator and the second input shaft, and a second intermediate shaft disposed without rotational interference with the first intermediate shaft and operably connected to the second motor/generator;
    a friction member selectively connecting the first intermediate shaft to a transmission housing;
    an output device operably connected to the input device and the supplemental input device and outputting torque transmitted from the input device or the supplemental input device; and
    a final reduction device decelerating torque transmitted from the output device and outputting the decelerated torque;
    a first input gear fixedly disposed on the second input shaft; and
    a second input gear directly connected to the third rotation element of the planetary gear set, wherein the supplemental input device comprises:
a first intermediate gear fixedly disposed on the first intermediate shaft and engaged with the first input gear; and
a second intermediate gear fixedly disposed on the second intermediate shaft and engaged with the second input gear, and
wherein the first intermediate shaft is a hollow shaft and the second intermediate shaft penetrates through the first intermediate shaft.

2. The power transmission system of claim 1, further comprising a one-way clutch disposed between the first input shaft and the transmission housing.

3. The power transmission system of claim 1, wherein the planetary gear set is a single pinion planetary gear set.

4. The power transmission system of claim 3, wherein the first rotation element is a sun gear, the second rotation element is a planet carrier, and the third rotation element is a ring gear.

5. The power transmission system of claim 4, further comprising a clutch disposed between the planet carrier and the ring gear and direct-coupling the planetary gear set selectively.

6. The power transmission system of claim 1, wherein the second input shaft is a hollow shaft and the first input shaft penetrates through the second input shaft.

7. The power transmission system of claim 1, wherein the friction member is a brake disposed between the first intermediate shaft and the transmission housing.

8. The power transmission system of claim 1, wherein the output device comprises:
an output shaft disposed in parallel with and apart from the first and second input shafts;
a first output gear fixedly disposed on one side portion of the output shaft and engaged with the second input gear and the second intermediate gear; and
a second output gear disposed at another side portion of the output shaft and configured to transmit torque to the final reduction device.

9. The power transmission system of claim 8, wherein the final reduction device comprises:
a final reduction gear engaged with the second output gear; and
a differential apparatus receiving torque from the output device through the final reduction gear and transmitting the torque to a driving wheel.

10. A power transmission system of a hybrid electric vehicle which uses an engine and first and second motor/generators as power sources, comprising:
an input device including a first input shaft receiving torque of the engine, a second input shaft disposed without rotational interference with the first input shaft, a first input gear fixedly disposed on the second input shaft, and a second input gear;
a planetary gear set including a sun gear directly connected to the second input shaft, a planet carrier directly connected to the first input shaft, and a ring gear directly connected to the second input gear as rotation elements of the planetary gear set;
a supplemental input device including a first intermediate shaft disposed in parallel with and apart from the first and second input shafts and operably connected to the first motor/generator and the second input shaft, and a second intermediate shaft disposed without rotational interference with the first intermediate shaft and operably connected to the second motor/generator; and
an output device operably connected to the input device and the supplemental input device and outputting torque transmitted from the input device or the supplemental input device,
wherein the supplemental input device further comprises:
a first intermediate gear fixedly disposed on the first intermediate shaft and engaged with the first input gear; and
a second intermediate gear fixedly disposed on the second intermediate shaft and engaged with the second input gear, and
wherein the output device comprises:
an output shaft disposed in parallel with and apart from the first and second input shafts;
a first output gear fixedly disposed on one side portion of the output shaft and engaged with the second input gear and the second intermediate gear; and
a second output gear disposed at another side portion of the output shaft and configured to transmit torque to the final reduction device.

11. The power transmission system of claim 10, further comprising a final reduction device decelerating torque transmitted from the output device and outputting the decelerated torque.

12. The power transmission system of claim 10, further comprising a one-way clutch disposed between the first input shaft and a transmission housing.

13. The power transmission system of claim 10, further comprising a clutch disposed between the planet carrier and the ring gear and direct-coupling the planetary gear set selectively.

14. The power transmission system of claim 10, further comprising a brake disposed between the first intermediate shaft and a transmission housing and selectively connecting the first intermediate shaft to the transmission housing.

* * * * *